(12) United States Patent
Hara

(10) Patent No.: US 6,602,031 B2
(45) Date of Patent: Aug. 5, 2003

(54) MACHINING METHOD AND MIST SUPPLYING APPARATUS

(75) Inventor: Mitsugu Hara, Osaka (JP)

(73) Assignee: Japan Speed Shore Co., Ltd., Shijonawate (JP)

( * ) Notice: Subject to any disclaimer, the term of this patent is extended or adjusted under 35 U.S.C. 154(b) by 17 days.

(21) Appl. No.: 09/789,925

(22) Filed: Feb. 22, 2001

(65) Prior Publication Data

US 2001/0025891 A1 Oct. 4, 2001

(30) Foreign Application Priority Data

Feb. 22, 2000 (JP) ........................................ 2000-044920
Jan. 23, 2001 (JP) ........................................ 2001-014649

(51) Int. Cl.[7] ............................ B23C 9/00; B23B 51/06
(52) U.S. Cl. .......................... 409/131; 408/59; 409/136
(58) Field of Search ................................ 409/131, 136, 409/137, 233, 231; 408/57, 56, 59, 60; 407/11

(56) References Cited

U.S. PATENT DOCUMENTS 5,676,506 A    10/1997  Sugata ...................... 409/136
6,085,782 A  * 7/2000  Ott ............................ 137/580
6,123,270 A  * 9/2000  Hara .......................... 239/422

FOREIGN PATENT DOCUMENTS

| DE | 42 08 063 A1 | 9/1993 |
| DE | 198 15 134 A1 | 10/1998 |
| EP | 0860231 A1 | 8/1998 |
| GB | 1 238 804 | 7/1971 |
| JP | 10-29131 | 2/1998 |
| JP | 11-235641 | 8/1999 |

* cited by examiner

Primary Examiner—William Briggs
(74) Attorney, Agent, or Firm—Armstrong, Westerman & Hattori, Ltd.

(57) ABSTRACT

The present invention provides a method for machining a workpiece, which comprises the steps of: separately supplying compressed air and a liquid into a through-hole longitudinally extending through a drawbar within a spindle of a machine tool; allowing the compressed air and the liquid to separately flow through the through-hole; mixing the liquid with the compressed air in a distal end portion of the through-hole so as to make the liquid into a mist form; ejecting the resulting mist from a distal open end of the through-hole to supply the mist to a distal end of a tool along an outer periphery of the tool or through the inside of the tool; and machining the workpiece while ejecting the mist from the distal end of the tool to supply the mist to a machining part.

6 Claims, 8 Drawing Sheets

MACHINING METHOD AND MIST SUPPLYING APPARATUS

BACKGROUND OF THE INVENTION

1. Field of the Invention

The present invention relates to a method for performing machining operations such as cutting and grinding operations on a workpiece, and to a mist supplying apparatus for use in the method.

2. Description of the Prior Art

In a machining operation such as a cutting or grinding operation, it is a conventional practice to supply a liquid to a machining part from a liquid supply nozzle extending thereto for dissipation of heat generated by contact between a workpiece and a machining tool. Where a large-scale stand-up machine tool such as a machining center is employed for the machining operation, however, the liquid and debris are liable to accumulate in a machined recess, thereby deteriorating the machining performance. When the workpiece is cut by intermittently bringing a carbide tool into contact with the workpiece, a machining point of a cutting edge of the tool is heated to a high temperature while the other portion thereof is cooled by the liquid supply. The repeated thermal shock may cause the cutting edge to chip (so-called chipping phenomenon) or crack.

For this reason, the cooling has recently been achieved by ejecting the liquid in a mist form, rather than as it is, toward the workpiece and the tool. Unlike the aforesaid direct liquid supply, this approach is free from the accumulation of the liquid in the machined recess and the chipping phenomenon due to the sudden cooling.

Another approach is to utilize a spindle of a machine tool for supplying a coolant to a machining part. In a tool mounting device as disclosed in Japanese Unexamined Patent Publication No. 10-29131 (1998), for example, a coolant supplied from a rotary joint 81 as a coolant supply source flows through a coolant channel (not shown) vertically extending through a drawbar 83 within a spindle 82, a coolant channel (not shown) vertically extending through a tool holder 84 and a coolant channel vertically extending through a tool (not shown), and then is ejected from a distal end of the tool as shown in FIG. 10.

Where the coolant to be employed in this device is in a liquid form, however, the accumulation of the liquid in the machined recess and the chipping phenomenon may occur as described above. Where the coolant is in a mist form, on the other hand, a liquid component of the coolant (which has a greater specific gravity than a gaseous component of the coolant) is liable to be forced toward the circumference of the drawbar 83 by a centrifugal force generated by high speed rotation of the drawbar when the coolant flows through the coolant channel within the drawbar 83. Therefore, the machining part cannot evenly be cooled or lubricated.

In view of the foregoing, it is an object of the present invention to provide a machining method and a mist supplying apparatus for use in the method, which can eliminate the problems associated with the direct liquid supply by ejection of a liquid in a mist form, and ensure homogeneous mixing of the liquid and air even with a construction utilizing a spindle of a machine tool.

SUMMARY OF THE INVENTION

In accordance with a first aspect of the present invention to achieve the aforesaid object, there is provided a method for machining a workpiece, which comprises the steps of: separately supplying compressed air and a liquid into a through-hole longitudinally extending through a drawbar within a spindle of a machine tool; allowing the compressed air and the liquid to separately flow through the through-hole; mixing the liquid with the compressed air in a distal end portion of the through-hole so as to make the liquid into a mist form; ejecting the resulting mist from a distal open end of the through-hole to deliver the mist to a distal end of a tool along an outer periphery of the tool or through the inside of the tool; and machining the workpiece while ejecting the mist from the distal end of the tool to supply the mist to a machining part.

In accordance with a second aspect of the present invention, there is provided a mist supplying apparatus, which comprises: a casing; a spindle rotatably supported within the casing and having a bore longitudinally extending therethrough; a drawbar disposed in the bore of the spindle for unitary rotation with the spindle and having a through-hole longitudinally extending therethrough; a tool holder detachably fixed to the drawbar; a tool detachably fixed to the tool holder; a compressed air channel and a liquid channel separately provided in the through-hole of the drawbar, the compressed air channel being supplied with compressed air from a compressed air supplier, the liquid channel being supplied with a liquid from a liquid supplier; and a channel provided in the tool holder; whereby the compressed air and the liquid are respectively ejected from the compressed air channel and the liquid channel so that the liquid is made into a mist form by the compressed air at an end of the drawbar adjacent to the tool holder, and the resulting mist is delivered to a distal end of the tool through the channel of the tool holder and along an outer periphery of the tool or through the inside of the tool so as to be ejected from the distal end of the tool.

In the machining method according to the present invention, the compressed air and the liquid are separately supplied into the through-hole longitudinally extending through the drawbar within the spindle of the machine tool, and allowed to separately flow through the through-hole when the workpiece is machined. When the compressed air and the liquid flow in an unmixed state through the through-hole of the drawbar rotating at a high speed, the centrifugal force generated by the high speed rotation may influence the compressed air and the liquid, but the mixing of the compressed air and the liquid thereafter carried out is not adversely affected. In addition, the liquid is mixed with the compressed air in the distal end portion of the through-hole so as to be made into a mist form. Then, the resulting mist is ejected from a distal open end of the through-hole, and supplied to the distal end of the tool along the outer periphery of the tool or through the inside of the tool. The machining operation is performed, while the mist is ejected from the distal end of the tool toward the machining part. Where the liquid is thus supplied in a mist form to the machining part, the accumulation of the liquid in a machined recess and the chipping phenomenon due to sudden cooling can be avoided which may otherwise occur in the case of the direct liquid supply. On the other hand, the mist supplying apparatus according to the present invention provides the same function and effect as the inventive machining method. The term "machining part" herein means, for example, a surface of the tool involved in the machining operation and a surface of the workpiece being machined. In the present invention, the mist may be supplied to the distal end of the tool along the outer periphery of the tool as well as through the inside of the tool.

Where a mixture of a cooling liquid and a cutting liquid is supplied as the liquid into the through-hole in the inventive machining method, a cooling effect and a lubricating effect can simultaneously be provided to the machining part. Where the inventive mist supplying apparatus is adapted to supply a mixture of the cooling liquid and the cutting liquid into the liquid channel, the same function and effect can be ensured.

Where the cooling liquid and the cutting liquid are separately supplied as the liquid into the through-hole and allowed to separately flow through the through-hole in the inventive machining method, the cooling liquid and the cutting liquid are not mixed until these liquids reach the distal end portion of the through-hole, so that degradation in the quality of these liquids is suppressed. In addition, the cooling liquid and the cutting liquid are made into a mist form and then mixed with each other in the distal end portion of the through-hole. Thus, the mixing of the cooling liquid and the cutting liquid is sufficiently carried out, thereby providing an excellent cooling effect and lubricating effect. Where a cooling liquid channel and a cutting liquid channel are separately provided as the liquid channel and a cooling liquid supply channel for supplying the cooling liquid to the cooling liquid channel from a cooling liquid supplier and a cutting liquid supply channel for supplying the cutting liquid to the cutting liquid channel from a cutting liquid supplier are separately provided in the inventive mist supplying apparatus, the same function and effect can be ensured.

DETAILED DESCRIPTION OF PREFERRED EMBODIMENT

An embodiment of the present invention will hereinafter be described in detail with reference to the attached drawings.

Figure 1:
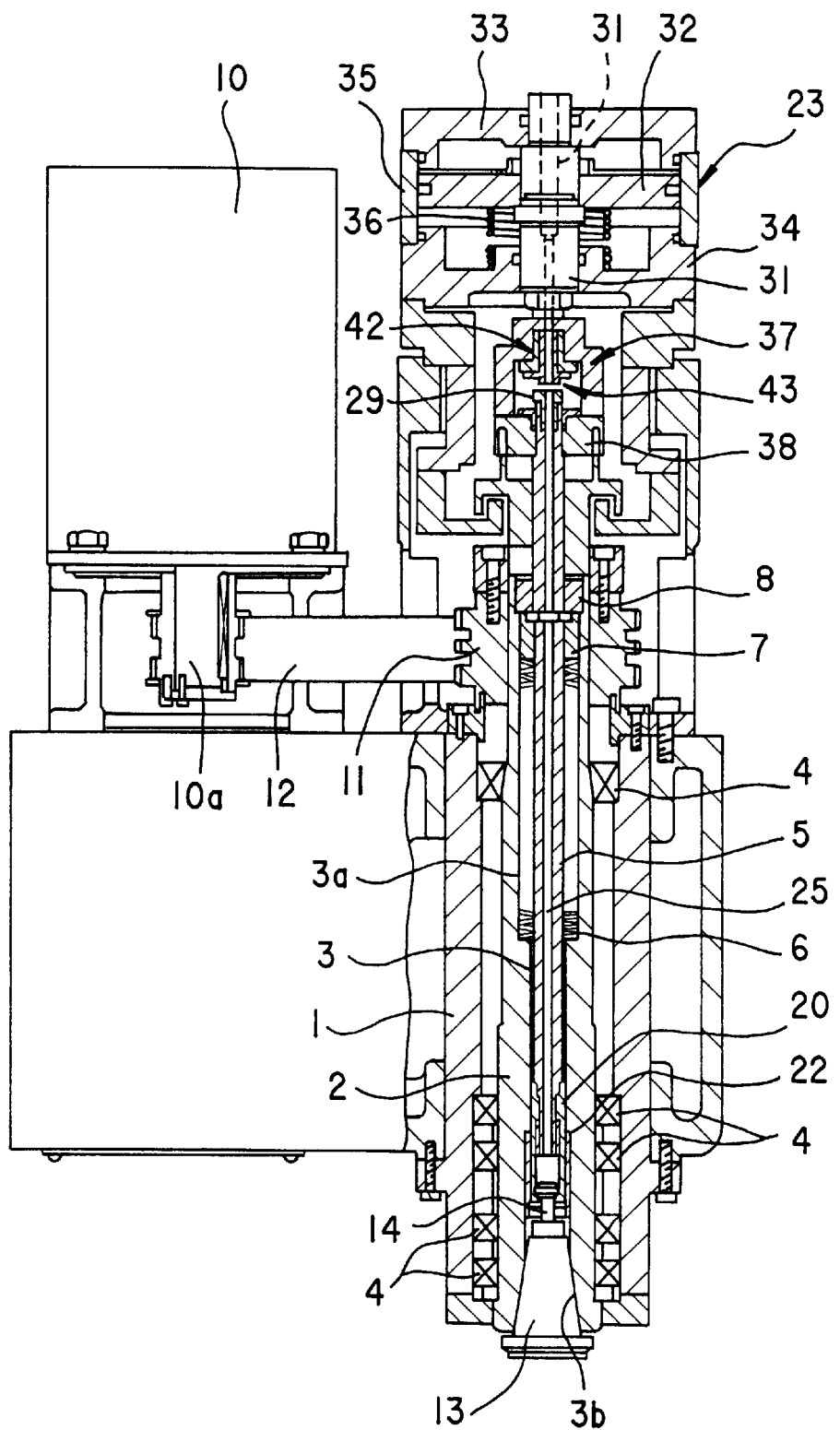
FIG. 1 is an explanatory diagram illustrating a mist supplying apparatus according to one embodiment of the present invention.

FIG. 1 illustrates a mist supplying apparatus according to one embodiment of the present invention. As shown in FIG. 1, a generally round tubular spindle 2 is rotatably supported in a cylindrical casing 1 by bearings 4. A generally round tubular drawbar 5 is provided in a center through-hole 3 of the spindle 2 so as to be movable longitudinally of the spindle 2 (vertically in this embodiment). Belleville springs 6 are accommodated in an upper large-diameter portion 3a of the center through-hole 3 of the spindle 2 to resiliently bias the drawbar 5 upward via a stationary member 7 fixed to the drawbar 5. The belleville springs 6 contact an inner periphery of the upper large-diameter portion 3a of the spindle 2 and an outer periphery of the drawbar 5, so that the rotation of the spindle 2 is transmitted to the drawbar 5 by a frictional resistance caused by the contact. Therefore, the drawbar 5 is rotatable unitarily with the spindle 2 when the spindle 2 is rotated. A stopper 8 is fixed to an upper end of the upper large-diameter portion 3a of the spindle 2 for preventing upward movement of the stationary member 7.

A reference character 10 denotes a motor, and a reference character 11 denotes a pulley fixed around an upper end portion of the spindle 2. A belt 12 is stretched around a rotation axis 10a of the motor 10 and the pulley 11 around the spindle 2, so that the rotation of the rotation axis 10a is transmitted to the spindle 2 via the belt 12.

Figure 2:
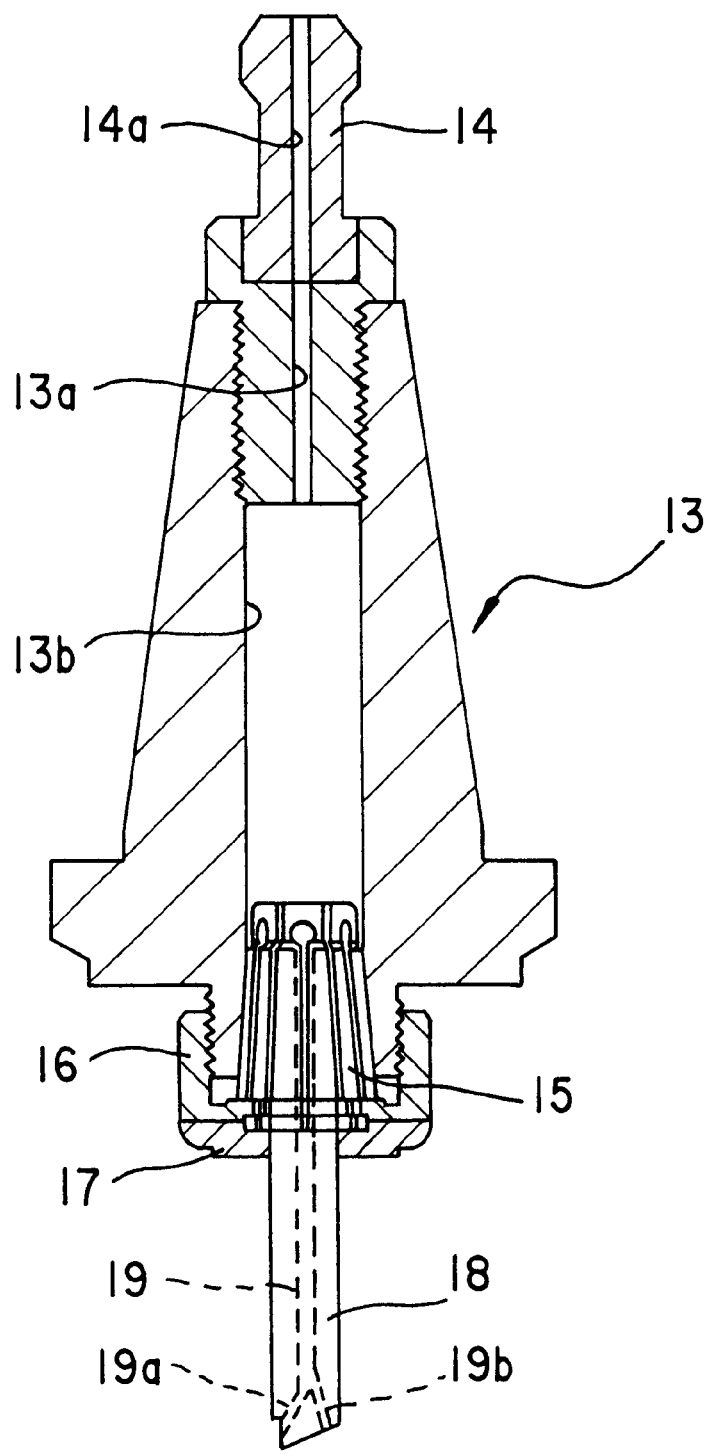
FIG. 2 is a sectional view of a tool holder.

A tool holder 13 is removably inserted into a downwardly flared chuck 3b provided in a lower end portion of the center through-hole 3 of the spindle 2. As shown in FIG. 2, a pull-stud 14 is fixed to an upper end of the tool holder 13, and a tool 18 is removably fixed to a lower end of the tool holder 13 by a collet 15, a clamp nut 16 and a cap 17. A through-hole (consisting of an upper small-diameter through-hole 13a and a lower large-diameter through-hole 13b) longitudinally extending through the tool holder 13 and a through-hole 14a longitudinally extending through the pull-stud 14 are aligned with each other in communication with each other. The tool 18 has a bifurcated channel 19 extending downward from an upper end thereof with one branch channel 19a opening into a rake face of the tool 18 and with the other branch channel 19b opening into a flank of the tool 18. A minute gap which permits passage of a mist mixture as will be described later is defined between an outer periphery of the tool 18 and an inner periphery of the collet 15.

Figure 3:
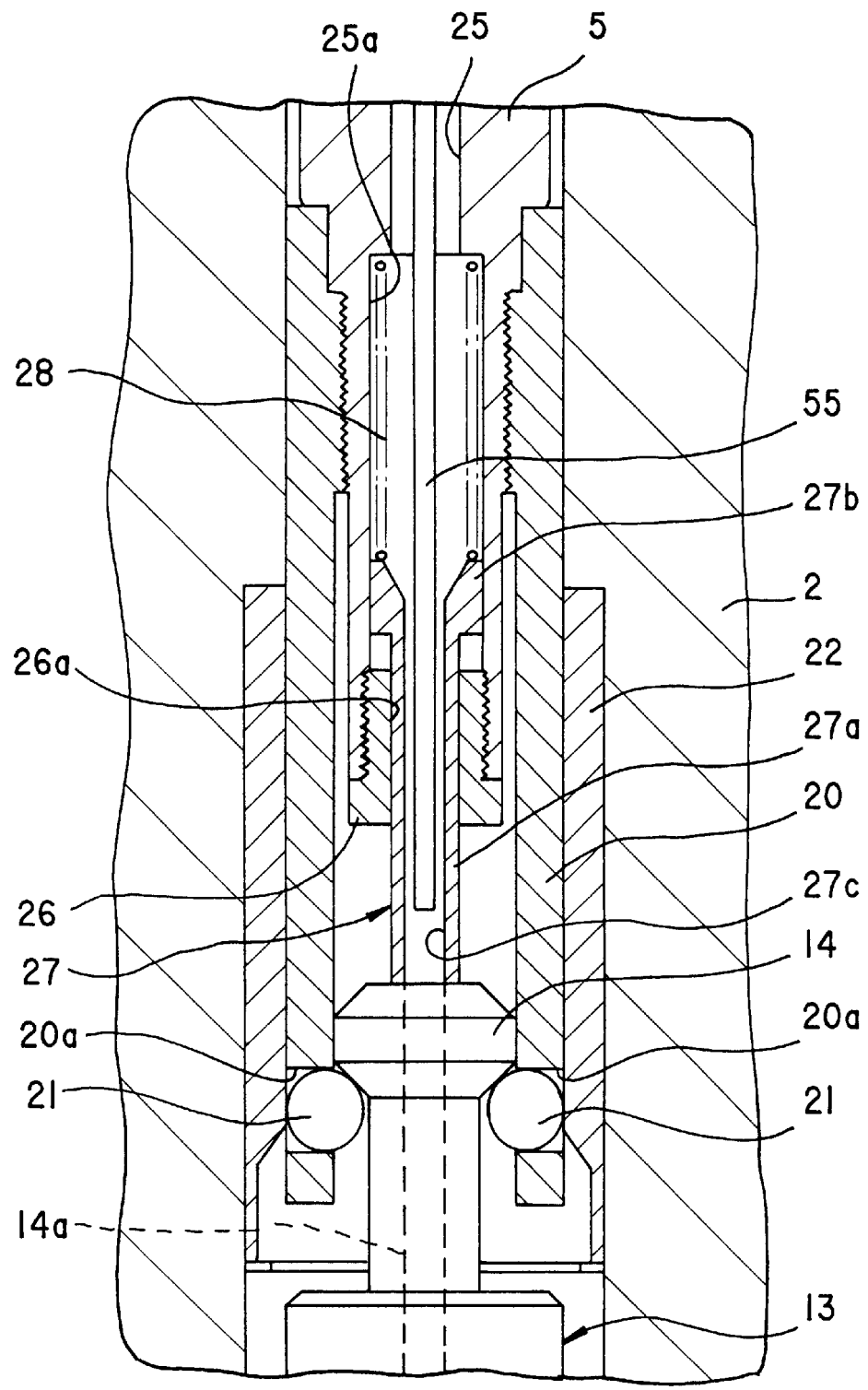
FIG. 3 is a sectional view of a major portion of the mist supplying apparatus.

As shown in FIG. 3, a first round tube 20 is threadingly fixed to a lower outer peripheral portion of the drawbar 5, and has four holes 20a (two of which are not seen in FIG. 3) formed in a lower end portion thereof to respectively accommodate steel balls 21 in a radially movable manner. A second round tube 22 is fitted in the center through-hole 3 of the spindle 2, and its lower inner peripheral portion has a larger diameter. The pull-stud 14 can be brought into a clamped state or into a unclamped state with respect to the first round tube 20 by actuation of an air cylinder 23 to be described later. It is noted that the first and second round tubes and the like serve as the clamping assembly for the tool holder 13.

The drawbar 5 is formed with a center through-hole 25 which has a lower large-diameter portion 25a at a lower end thereof. A stopper nut 26, an active shaft 27 and a spring 28 (which are not shown in FIG. 1) are incorporated in the lower large-diameter portion 25a.

More specifically, the stopper nut 26 is threadingly fixed to a lower end portion of the lower large-diameter portion 25a. The stopper nut 26 has a center through-hole 26a extending therethrough longitudinally of the drawbar 5, and the active shaft 27 is inserted in the center through-hole 26a in a vertically movable manner. The active shaft 27 includes a tubular potion 27a and a flange 27b projecting from an upper end of the tubular portion 27a, and the tubular portion 27a has a center through-hole 27c extending therethrough longitudinally of the drawbar 5. With the flange 27b of the active shaft 27 being fitted in the lower large-diameter portion 25a of the drawbar 5, the tubular portion 27a of the active shaft 27 is inserted in the center through-hole 26a of the stopper nut 26. The spring 28 is disposed between an upper end face of the flange 27b of the active shaft 27 and an upper end of the lower large-diameter portion 25a of the drawbar 5 for resiliently biasing the active shaft 27 downward. Where the pull-stud 14 is in the clamped state, a lower end of the active shaft 27 constantly abuts against an upper end face of the pull-stud 14 by a resilient biasing force of the spring 28. Therefore, the center through-hole 27c of the active shaft 27 constantly communicates with the through-hole 14a of the pull-stud 14.

Figure 4:
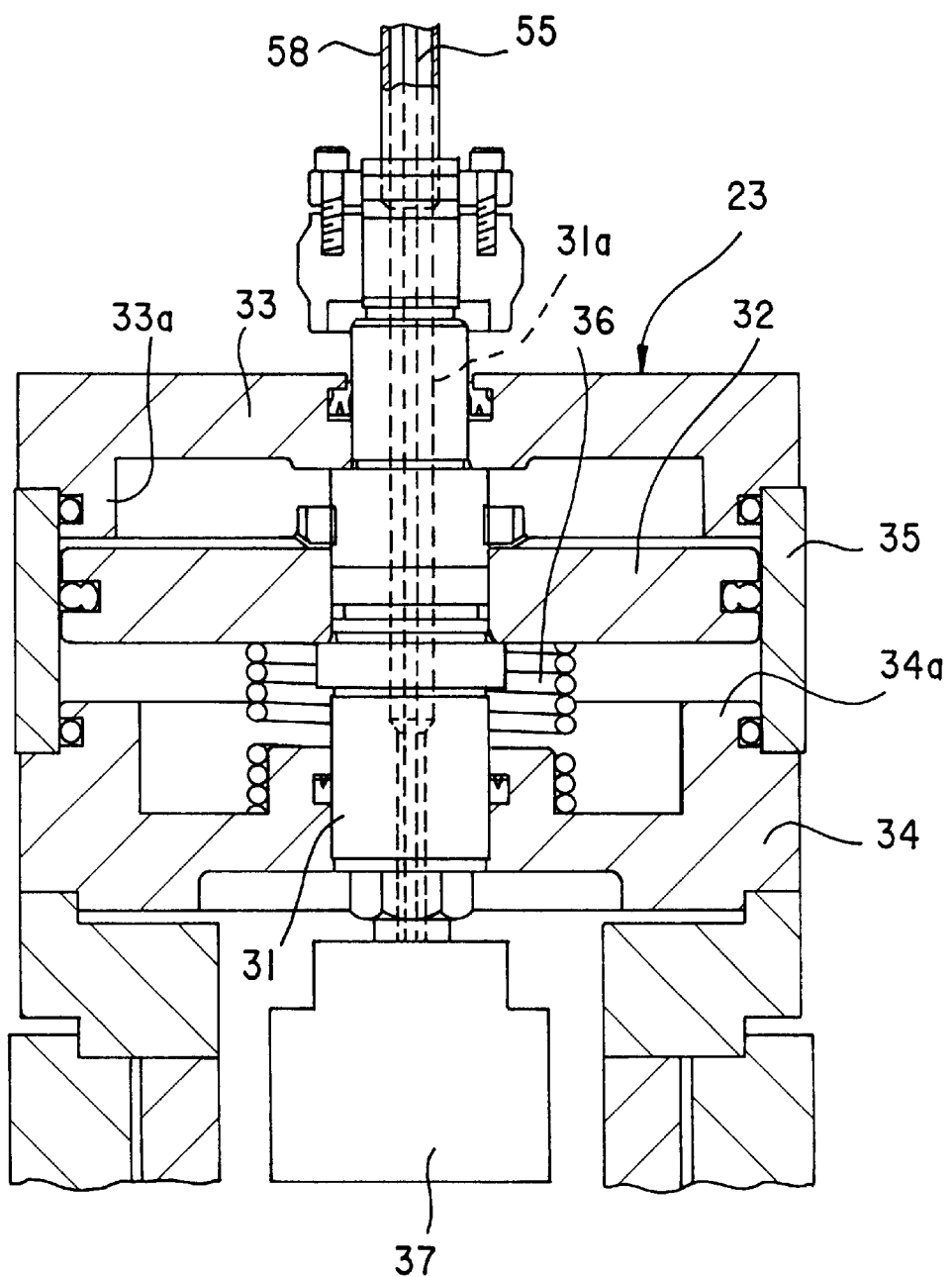
FIG. 4 is a sectional view of an air cylinder.

As shown in FIG. 4, the air cylinder 23 has a cylinder rod 31, a rod flange 32, an upper cylinder wall 33 having a stopper portion 33a projecting from an outer periphery thereof, a lower cylinder wall 34 having a stopper portion 34a projecting from an outer periphery thereof, an intermediate cylinder wall 35, a spring 36 for resiliently biasing the rod flange 32 upward, a high pressure air channel (not shown) for communication between an upper cylinder chamber of the rod flange 32 and an external high pressure air supply source (not shown), and a high pressure air channel (not shown) for communication between a lower cylinder chamber of the rod flange 32 and the high pressure air supply source. A topped cylindrical case 37 is fixed to a lower end of the cylinder rod 31. A stationary member 38 (see FIG. 5) fitted around an upper end portion of the drawbar 5 is adapted to be pressed downward by a lower end face of the case 37.

By supplying high pressure air into the lower cylinder chamber of the rod flange 32, the cylinder rod 31 is moved up, so that a pressure downwardly applied to the belleville springs 6 is relieved. Thus, the drawbar 5 is moved up via the stationary member 7 by the resilient biasing force of the belleville springs 6, whereby the pull-stud 14 is brought into the clamped state. By supplying high pressure air into the upper cylinder chamber of the rod flange 32, the cylinder rod 31 is moved down, and the downward movement of the cylinder rod 31 is transmitted to the drawbar 5 via the case 37 and the stationary member 38. Thus, the drawbar 5 is moved down against the resilient biasing force of the belleville springs 6, whereby the pull-stud 14 is brought into the unclamped state.

Figure 5:
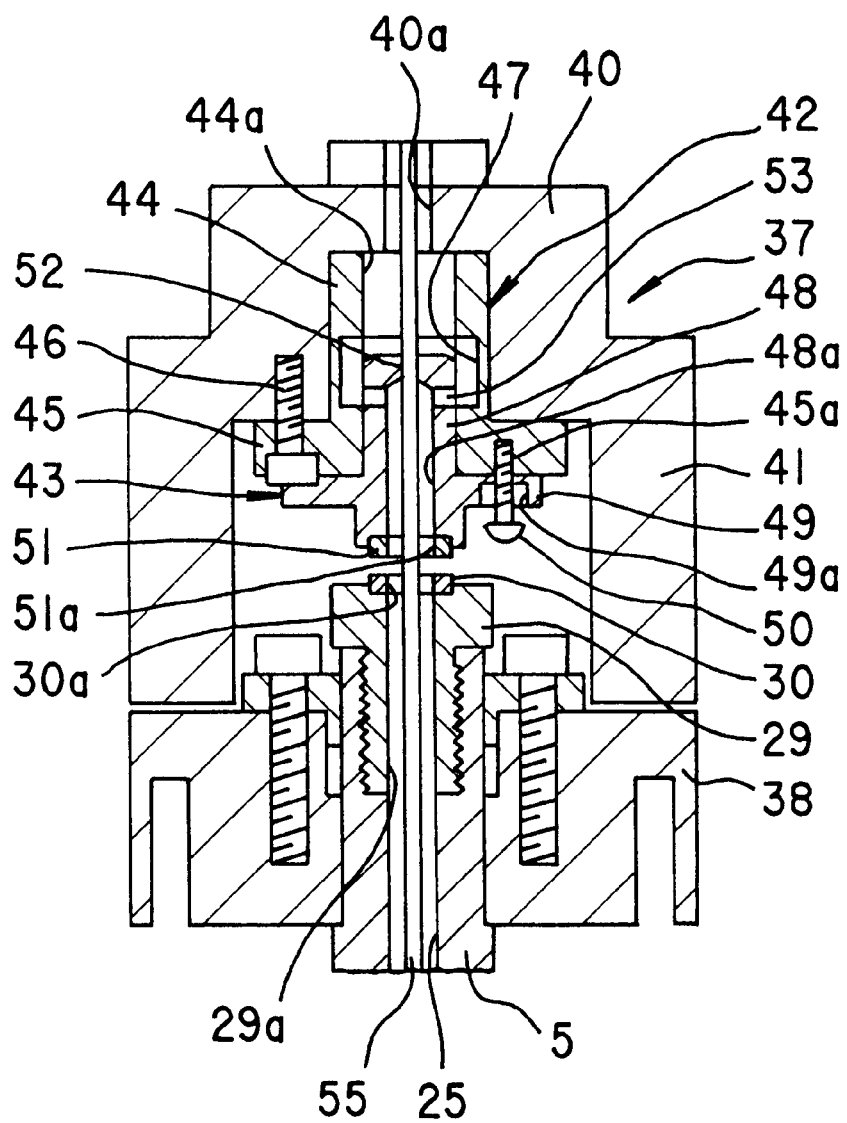
FIG. 5 is a sectional view of a major potion of the mist supplying apparatus.
Figure 6:
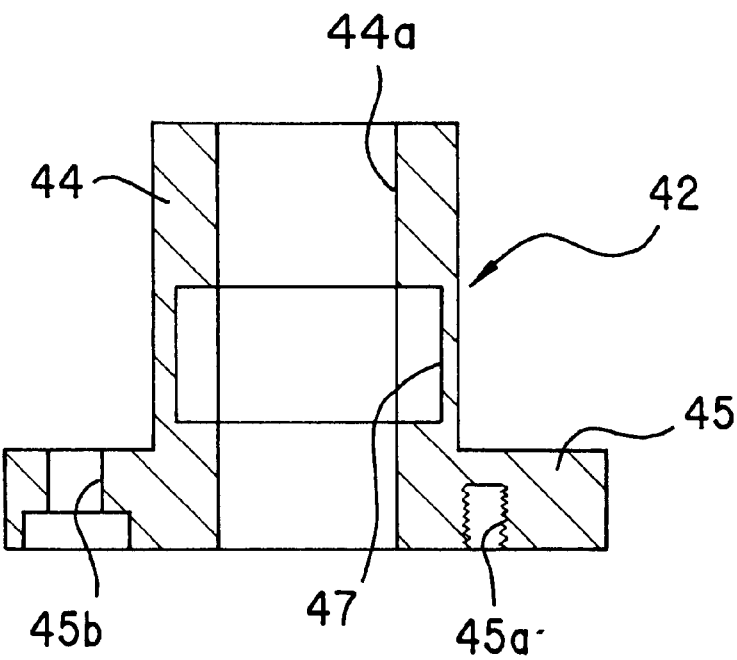
FIG. 6 is a sectional view of a first rotary seal.

As shown in FIG. 5, the case 37 includes an upper small-diameter cylindrical portion 40 and a lower large-diameter cylindrical portion 41, in which first and second rotary seals 42 and 43 are respectively provided. As shown in FIG. 6, the first rotary seal 42 includes a tubular portion 44 and a flange 45 projecting from a lower peripheral portion of the tubular portion 44. The flange 45 is fixed to the case 37 by a bolt 46. A center through-hole 44a of the tubular portion 44 has a single annular recess 47 formed in a midportion thereof. In FIG. 6, a reference character 45b denotes a bolt insertion hole formed in the flange 45 of the first rotary seal 42.

Figure 7:
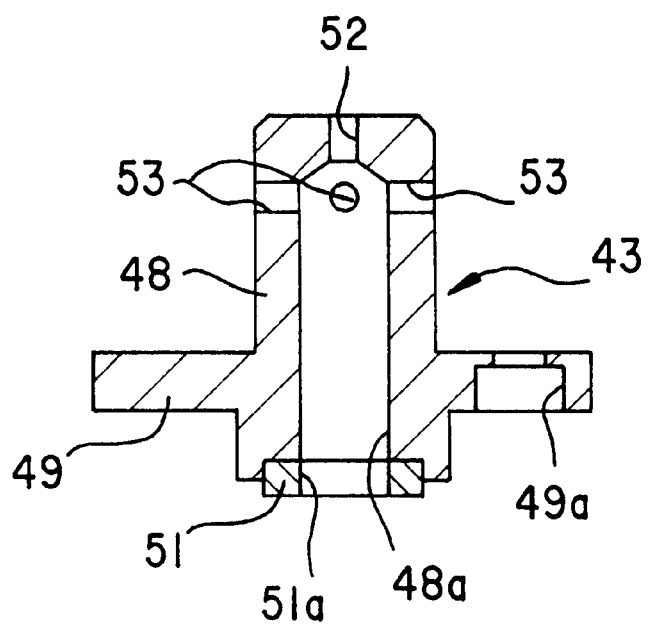
FIG. 7 is a sectional view of a second rotary seal.
Figure 8:
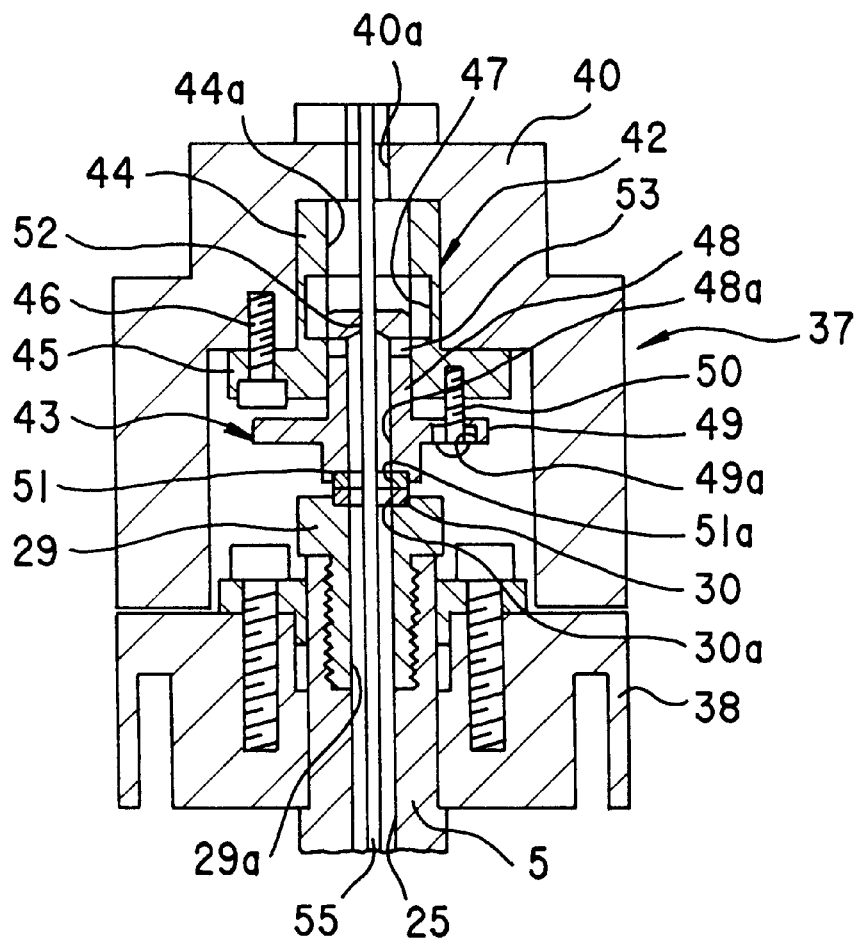
FIG. 8 is a sectional view for explaining the function of the mist supplying apparatus.

As shown in FIG. 7, the second rotary seal 43 includes a topped cylindrical portion 48 and a flange 49 provided on a lower peripheral portion of the topped cylindrical portion 48. The flange 49 is formed with four bolt insertion holes 49a (three of which are not seen in FIG. 7) in which bolts 50 (see FIG. 5) are inserted. These bolt insertion holes 49a each have a larger diameter than thread portions of the bolts 50. The flange 45 of the first rotary seal 42 has threaded holes 45a (see FIG. 6) which are respectively formed therein in alignment with the bolt insertion holes 49a so as to be brought into threaded engagement with the bolts 50. The thread portions of the bolts 50 each have a projection length which is greater than the thickness of the flange 49 of the second rotary seal 43 with the bolts 50 being respectively fitted in the threaded holes 45a. With this arrangement, the second rotary seal 43 is attached to the first rotary seal in a vertically movable manner. Thus, the second rotary seal 43 can be moved down along the bolts 50 thereby to be brought into an abutment state (see FIG. 8) where a lower end face of the second rotary seal 43 abuts against an upper end face of a nut 29 to be described later, and then moved up along the bolts 50 thereby to be brought out of the abutment state into a spaced state (see FIG. 5) where the lower end face of the second rotary seal 43 is spaced from the upper end face of the nut 29.

A ceramic seal 51 is fixed to the lower end face of the second rotary seal 43, and a center through-hole 51a is formed in the seal 51 in alignment with a center through-hole 48a of the topped cylindrical portion 48 of the second rotary seal 43. The topped cylindrical portion 48 has two vertical holes formed in a central portion of a top wall (a cooling water inlet tube 55 to be described later is inserted in one of the vertical holes 52, and a cutting liquid inlet tube 56 to be described later is inserted in the other vertical hole 52, which is not seen in FIG. 7), and four transverse holes 53 (one of which is not seen in FIG. 7).

As shown in FIG. 5, the nut 29 which is fitted with a ceramic seal 30 on the upper end face thereof is threadingly fitted in an upper end portion of the center through-hole 25 of the drawbar 5. When the drawbar 5 is in the abutment state, the seal 30 abuts against the seal 51 of the second rotary seal 43. The nut 29 has a center through-hole 29a extending therethrough longitudinally of the drawbar 5, and the seal 30 is formed with a center through-hole 30a in alignment with the center through-hole 29a.

Figure 9:
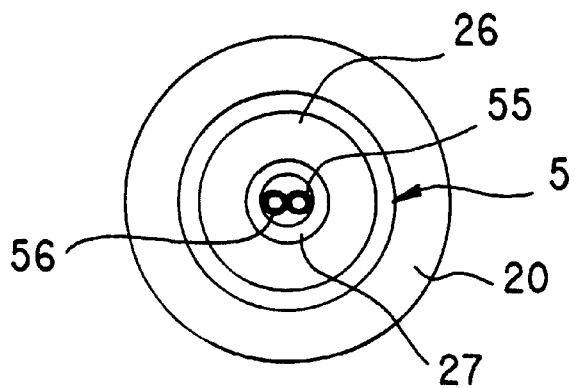
FIG. 9 is an explanatory diagram illustrating two inlet tubes.
Figure 10:
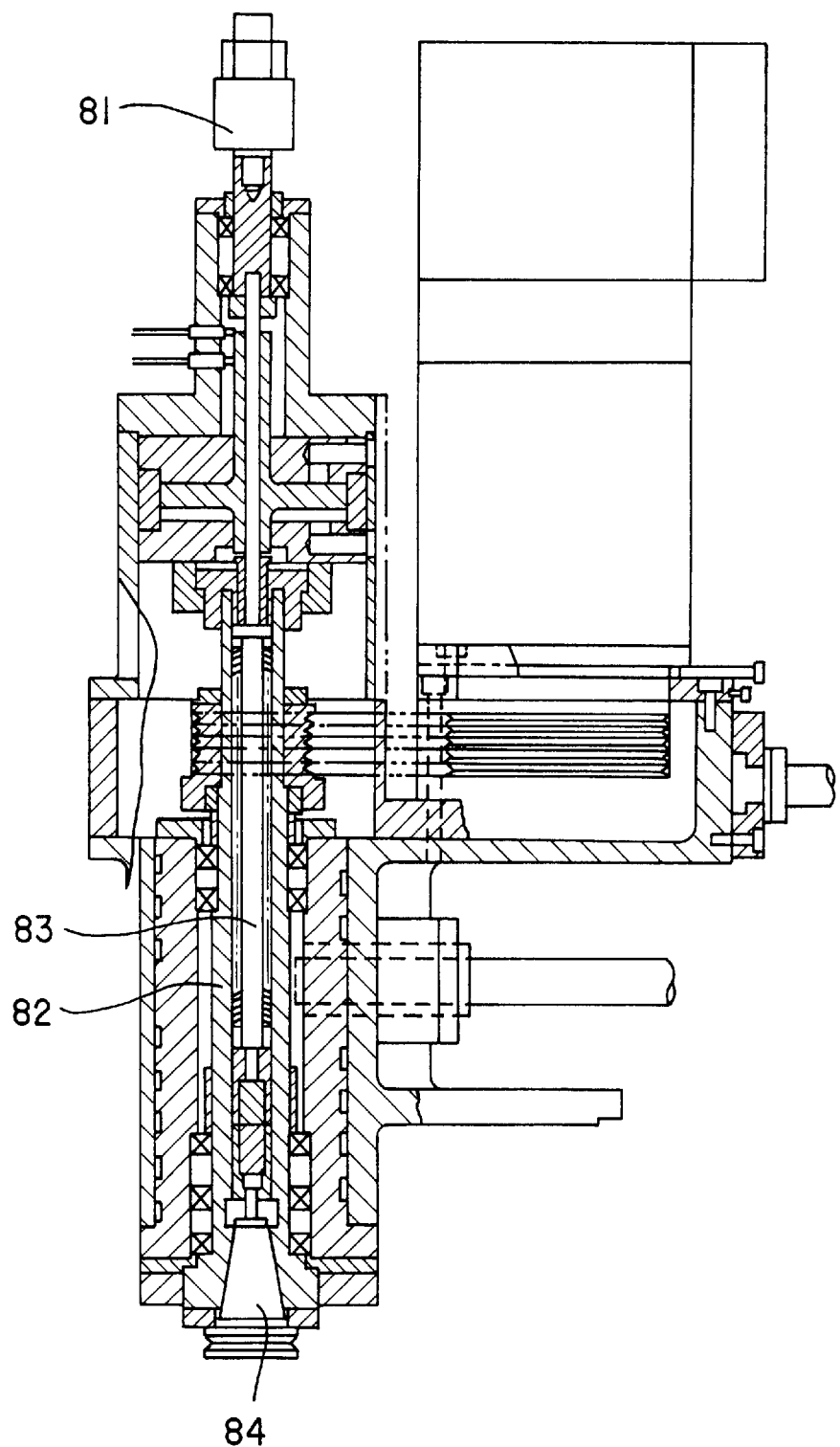
FIG. 10 is an explanatory diagram of the prior art.

The single cooling water inlet tube 55 and the single cutting liquid inlet tube 56 (see FIG. 9) are inserted in the center through-hole 25 of the drawbar 5 and a center through-hole 31a formed along the center line of the cylinder rod 31 of the air cylinder 23 (the inlet tubes 55, 56 are not shown in FIG. 1).

More specifically, the inlet tubes 55, 56 extend through the center through-hole 31a of the cylinder rod 31, a center through-hole 40a formed in a top wall of the upper small-diameter cylindrical portion 40 of the case 37 (see FIG. 5), the center through-hole 44a of the first rotary seal 42, the respective vertical holes 52 of the topped cylindrical portion 48 of the second rotary seal 43, the center through-hole 48a of the topped cylindrical portion 48, the center through-hole 51a of the seal 51, the center through-hole 30a of the seal 30, the center through-hole 29a of the nut 29, and the center through-hole 25 of the drawbar 5 into the center through-hole 27c of the active shaft 27 thereby to reach a lower end portion of the center through-hole 27c.

Upper end portions of the inlet tubes 55, 56 project upward from the center through-hole 31a of the cylinder rod 31. The cooling water inlet tube 55 is connected to the cooling water supplier (not shown) including a cooling water tank containing a cooling water (e.g. tap water), a pump and the like via a cooling water supply pipe (not shown), and adapted to be supplied with the cooling water under a predetermined pressure from the cooling water supplier. On the other hand, the cutting liquid inlet tube 56 is connected to the cutting liquid supplier (not shown) including a cutting liquid tank containing a cutting liquid (e.g., Bluebe #LB-1 available from US ITW Corporation), a pump and the like via a cutting liquid supply pipe (not shown), and adapted to be supplied with the cutting liquid under a predetermined pressure from the cutting liquid supplier. The through-hole 31a of the cylinder rod 31 is connected to the compressed air supplier (not shown) including a compressor and the like via a compressed air supply pipe 58 (see FIG. 4), and adapted to be supplied with compressed air (containing a very small amount of a lubricating oil) under a predetermined pressure from the compressed air supplier.

Upon actuation of the motor 10, the spindle 2 starts rotating. This starts the rotation of the drawbar 5, whereby circular streams are generated on the upper end of the drawbar 5. The circular streams generate an upward force to force the second rotary seal 43 upward. Thus, the second rotary seal 43 starts moving upward. This brings the annular recess 47 of the tubular portion 44 of the first rotary seal 42 into communication with the respective transverse holes 53 of the topped cylindrical portion 48 of the secondary rotary seal 43, whereby the compressed air supplied from the compressed air supplier flows into the center through-hole 48a of the topped cylindrical portion 48 of the second rotary seal 43 via the annular recess 47 and the transverse holes 53. At this time, the distance of the upward movement of the secondary rotary seal 43 increases as the rotation speed of the spindle 2 increases. Therefore, effective area for the communication between the annular recess 47 and the respective transverse holes 53 increases as the rotation speed of the spindle 2 increases. Accordingly, the amount of the compressed air flowing into the center through-hole 48a of the topped cylindrical portion 48 increases. Thus, the compressed air flowing into the center through-hole 48a of the topped cylindrical portion 48 further flows through the center through-hole 51a of the seal 51, the center through-hole 30a of the seal 30, the center through-hole 29a of the nut 29 and the center through-hole 25 of the drawbar 5 to reach the lower end portion of the center through-hole 27c of the active shaft 27.

When the compressed air flows into the center through-hole 30a of the seal 30 from the center through-hole 51a of the seal 51, the seals 30 and 51 are spaced from each other, so that the compressed air leaks into a gap between the seals 51 and 30 to produce an air joint effect. In addition, the lubricating oil contained in the compressed air leaking into the gap prevents seizure of the seals 30, 51. On the other hand, when the motor 10 is deactuated, the rotation of the spindle 2 is stopped, so that the circular streams are no longer generated. Therefore, the second rotary seal 43 is moved down by gravity. Thus, the second rotary seal 43 is brought into the abutment state with the lower end face thereof abutting against the upper end face of the nut 29, whereby the annular recess 47 is brought out of communication with the respective transverse holes 53.

With the aforesaid arrangement, the compressed air is supplied into the center through-hole 31a of the cylinder rod 31, the cooling water is supplied into the cooling water inlet tube 55, and the cutting liquid is supplied into the cutting liquid inlet tube 56 upon the actuation of the motor 10. Then, the cooling water and the cutting liquid are ejected from the cooling water inlet tube 55 and from the cutting liquid inlet tube 56, respectively, into the lower end portion of the center through-hole 27c of the active shaft 27. At the same time, the cooling water and the cutting liquid are atomized into a mist form by the compressed air supplied into the center through-hole 31a of the cylinder rod 31, and mixed with each other. The resulting mist mixture flows out of the center through-hole 27c of the active shaft 27, and then flows through the through-hole 14a of the pull-stud 14 and the through-hole (the upper small-diameter through-hole 13a and the lower large-diameter through-hole 13b) of the tool holder 13. Most of the mist mixture flows into the channel 19 of the tool 18 so as to be ejected to the rake face of the tool 18 from the one branch channel 19a and to the flank of the tool 18 from the other branch channel 19b. The rest of the mist mixture (which has not flowed into the channel 19 of the tool 18) flows through the minute gap between the outer periphery of the tool 18 and the inner periphery of the collet 15, and then is ejected from the minute gap along the outer periphery of the tool 18.

In this embodiment, the cooling water and the cutting liquid are allowed to separately flow in a unmixed liquid state through the inside of the drawbar 5 rotating at a high speed as described above, so that the cooling water and the cutting liquid can thereafter be mixed homogeneously. Since the cooling water and the cutting liquid are mixed immediately before reaching the tool holder 13, the cooling water and the cutting liquid are kept in a mixed state for a shorter period of time. This suppresses the deterioration of the cutting liquid. In addition, the cooling water and the cutting liquid are mixed in a mist form and, therefore, the mixing can sufficiently be carried out to ensure an excellent cooling effect and lubricating effect. Since the tool is not subjected to sudden cooling unlike in the case of the direct liquid supply, the intermittent thermal shock can be eliminated. Therefore, the life of the tool can advantageously be extended significantly. Further, the mist mixture is ejected from the minute gap between the outer periphery of the tool 18 and the inner periphery of the collet 15 along the outer periphery of the tool 18. This makes it possible to protect a shoulder of the tool 18 (e.g., a drill). Further, ejection pressures of the compressed air, the cooling water and the cutting liquid can advantageously be varied according to machining conditions.

Although the cooling water inlet tube 55 and the cutting liquid inlet tube 56 are separately provided inside the drawbar 5 in the aforesaid embodiment, the arrangement for the supply of the cooling water and the cutting liquid is not limited thereto. A single inlet tube may be provided in the drawbar 5, so that a mixture of the cooling water and the cutting liquid is supplied into the inlet tube. In addition to the cooling water inlet tube 55 and the cutting liquid inlet tube 56, a compressed air inlet tube may be provided inside the drawbar 5. Although the tool 18 to be employed has the channel 19, the branch channels 19a and 19b in the aforesaid embodiment, a tool 18 formed with neither the channel 19 nor the branch channels 19a, 19b may be employed. In this case, only the portion of the mist mixture ejected from the minute gap between the outer periphery of the tool 18 and the inner periphery of the collet 15 along the outer periphery of the tool 18 is supplied to the machining part. In the aforesaid embodiment, the mist mixture is not necessarily required to be ejected from the minute gap along the outer periphery of the tool 18.

Since the cooling effect and the lubricating effect significantly vary depending on the type of the mist, it is preferred to control a mixing ratio between the cooling water and the cutting liquid by variably setting the supply amounts of the cooling water and the cutting liquid respectively introduced into the cooling water inlet tube 55 and the cutting liquid inlet tube 56, and to control the pressures of the compressed air, the cooling water and the cutting liquid respectively supplied into the center through-hole 31a of the cylinder rod 31, the cooling water inlet tube 55 and the cutting liquid inlet tube 56. In a high speed cutting operation, for example, the supply amount of the cooling water is increased to increase the ratio of the cooling water to the cutting liquid for enhancement of the cooling effect. In a low or medium speed cutting operation, the supply amount of the cutting liquid is increased to increase the ratio of the cutting liquid for enhancement of the lubricating effect.

Although the tap water is employed as the cooling water in the aforesaid embodiment, the cooling water is not limited thereto, and other examples thereof include pure water and ultra-pure water. In the aforesaid embodiment, Bluebe #LB-1 is employed as the cutting liquid, but the cutting liquid is not limited thereto. Any of various ordinary cutting liquids may be employed. Although the cooling water and the cutting liquid are employed as the liquid in the aforesaid embodiment, the liquid may be selected from various types of liquids such as emulsions and chemical agents.

The apparatus according to the present invention can be installed not only in the machining center for machining as in the aforesaid embodiment but also in various machine tools such as NC lathes and grinding machines.

In the machining method according to the present invention, as described above, the compressed air and the liquid are separately supplied into the through-hole longitudinally extending through the drawbar within the spindle of the machine tool, and allowed to separately flow through the through-hole when the workpiece is machined. When the compressed air and the liquid flow in an unmixed state through the through-hole of the drawbar rotating at a high speed, the centrifugal force generated by the high speed rotation may influence the compressed air and the liquid, but the mixing of the compressed air and the liquid thereafter carried out is not adversely affected. In addition, the liquid is mixed with the compressed air in the distal end portion of the through-hole so as to be made into a mist form. Then, the resulting mist is ejected from the distal open end of the through-hole, and delivered to the distal end of the tool along the outer periphery of the tool or through the inside of the tool. The machining operation is performed, while the mist is ejected from the distal end of the tool toward the machining part. Where the liquid is thus supplied in a mist form to the machining part, the accumulation of the liquid in the machined recess and the chipping phenomenon due to sudden cooling can be avoided which may otherwise occur in the case of the direct liquid supply. On the other hand, the mist supplying apparatus according to the present invention provides the same function and effect as the inventive machining method.

Where the mixture of the cooling liquid and the cutting liquid is supplied as the liquid into the through-hole in the inventive machining method, the cooling effect and the lubricating effect can simultaneously be provided to the machining part. Where the inventive mist supplying apparatus is adapted to supply the mixture of the cooling liquid and the cutting liquid into the liquid channel, the same function and effect can be ensured.

Where the cooling liquid and the cutting liquid are separately supplied as the liquid into the through-hole and allowed to separately flow through the through-hole in the inventive machining method, the cooling liquid and the cutting liquid are not mixed until these liquids reach the distal end portion of the through-hole, so that the degradation in the quality of these liquids is suppressed. In addition, the cooling liquid and the cutting liquid are made into a mist form and then mixed with each other in the distal end portion of the through-hole. Thus, the mixing of the cooling liquid and the cutting liquid is sufficiently carried out, thereby providing an excellent cooling effect and lubricating effect. Where the cooling liquid channel and the cutting liquid channel are separately provided as the liquid channel, and the cooling liquid supply channel for supplying the cooling liquid to the cooling liquid channel from the cooling liquid supplier and the cutting liquid supply channel for supplying the cutting liquid to the cutting liquid channel from the cutting liquid supplier are separately provided in the inventive mist supplying apparatus, the same function and effect can be ensured.

What is claimed is:

1. A method for machining a workpiece, comprising the steps of:
   separately supplying compressed air and a liquid into a through-hole longitudinally extending through a drawbar within a spindle of a machine tool;
   allowing the compressed air and the liquid to separately flow through the trough-hole;
   mixing the liquid with the compressed air in a distal end portion of the through-hole so as to make the liquid into a mist form;
   ejecting the resulting mist from a distal open end of the through-hole to deliver the mist to a distal end of a tool by a part of the mist flowing along an outer periphery of the tool and the rest of the mist flowing through the inside of the tool; and
   machining the workpiece while ejecting the mist to the distal end of the tool to supply the mist to a machining part.

2. A method as set forth in claim 1, wherein a mixture of a cooling liquid and a cutting liquid is supplied as the liquid into the through-hole.

3. A method as set forth in claim 1, wherein a cooling liquid and a cutting liquid are separately supplied as the liquid into the through-hole and allowed to separately flow through the through-hole.

4. A mist supplying apparatus comprising:
   a casing;
   a spindle rotatably supported within the casing and having a bore longitudinally extending therethrough;
   a drawbar disposed in the bore of the spindle for unitary rotation with the spindle and having a through-hole longitudinally extending therethrough;
   a tool holder detachably fixed to the drawbar via a clamping assembly;
   a tool detachably fixed to the tool holder;
   a compressed air channel and a liquid channel separately provided in the through-hole of the drawbar, the compressed air channel being supplied with compressed air from a compressed air supplier, the liquid channel being supplied with a liquid form a liquid supplier;
   a channel provided in the tool holder;
   whereby the compressed air and the liquid are respectively ejected from the compressed air channel and the liquid channel so that the liquid is made into a mist form by the compressed air at an end of the drawbar adjacent to the toolholder, the resulting mist is delivered to a distal end of the tool by a part of the mist flowing through the channel of the tool holder and along the outer periphery of the tool and the rest of the mist flowing through the channel of the tool holder and through the inside of the tool, and the machining operation is performed while the mist is ejected to the distal end of the tool toward the machining part.

5. A mist supplying apparatus as set forth in claim 4, wherein the liquid channel is supplied with a mixture of a cooling liquid and a cutting liquid.

6. A mist supplying apparatus as set forth in claim 4, wherein a cooling liquid channel and a cutting liquid channel are separately provided as the liquid channel, and a cooling liquid supply channel for supplying the cooling liquid to the cooling liquid channel from a cooling liquid supplier and a cutting liquid supply channel for supplying the cutting liquid to the cutting liquid channel from a cutting liquid supplier are separately provided.

* * * * *